(12) United States Patent
Ecker et al.

(10) Patent No.: US 8,904,679 B2
(45) Date of Patent: Dec. 9, 2014

(54) SPATIALLY DISTORTED IMAGE

(76) Inventors: Gerd Ecker, Alzey (DE); Sandra Schäffler, Enkenbach-Alsenborn (DE); Klaus Wedrich, Engelstadt (DE)

( * ) Notice: Subject to any disclaimer, the term of this patent is extended or adjusted under 35 U.S.C. 154(b) by 757 days.

(21) Appl. No.: 13/056,051

(22) PCT Filed: Jul. 29, 2009

(86) PCT No.: PCT/EP2009/059776
§ 371 (c)(1),
(2), (4) Date: Mar. 30, 2011

(87) PCT Pub. No.: WO2010/012752
PCT Pub. Date: Feb. 4, 2010

(65) Prior Publication Data
US 2011/0308119 A1    Dec. 22, 2011

(30) Foreign Application Priority Data

Jul. 31, 2008    (WO) ................ PCT/DE2008/001265

(51) Int. Cl.
*A47F 11/06*    (2006.01)
*G06Q 30/02*    (2012.01)
*G09F 19/12*    (2006.01)
*G09F 21/04*    (2006.01)

(52) U.S. Cl.
CPC ............... *G09F 19/12* (2013.01); *G06Q 30/02* (2013.01); *G09F 21/04* (2013.01)
USPC .......................................................... 40/427

(58) Field of Classification Search
USPC .......................................................... 40/427
See application file for complete search history.

(56) References Cited

U.S. PATENT DOCUMENTS

| 6,129,872 A | * | 10/2000 | Jang ................................. 264/75 |
| 2001/0019340 A1 | * | 9/2001 | Kubo et al. ....................... 347/1 |
| 2002/0021459 A1 | | 2/2002 | McAbee | |
| 2006/0117622 A1 | | 6/2006 | Sondergaard | |
| 2009/0169719 A1 | * | 7/2009 | Orr ................................. 427/8 |

FOREIGN PATENT DOCUMENTS

| DE | 19837887 A1 | 2/2000 |
| DE | 20317063 U1 | 2/2004 |
| EP | 0936593 A1 | 8/1999 |
| EP | 1418561 A1 | 5/2004 |
| EP | 1580710 A2 | 9/2005 |
| GB | 2227334 A | 7/1990 |
| WO | WO-97/31358 A1 | 8/1997 |
| WO | WO-98/43231 A1 | 10/1998 |

OTHER PUBLICATIONS

M. Samek et al., "Texture mapping and distortion in digital graphics", The Visual Computer, vol. 2, pp. 313-320, 1986.
B. Levy, "Constrained Texture Mapping for Polygonal Meshes", Computer Graphics Proceedings, Annual Conference Series, pp. 417-424, 2001.

* cited by examiner

*Primary Examiner* — Joanne Silbermann
(74) *Attorney, Agent, or Firm* — Drinker Biddle & Reath LLP

(57) ABSTRACT

The invention relates to a warped or curved surface with an image visible from a reference point which is not an element of the said surface, where the reference point has fixed position with respect to the said surface, and the image on the said surface is distorted in a way to provide an undistorted view on the said image from the said reference point.

9 Claims, 4 Drawing Sheets

SPATIALLY DISTORTED IMAGE

CROSS-REFERENCE TO RELATED APPLICATIONS

This application is a national stage application (under 35 U.S.C. §371) of PCT/EP2009/059776, filed Jul. 29, 2009, which claims benefit of German application PCT/DE2008/001265, filed Jul. 31, 2008.

FIELD OF THE INVENTION

The invention relates to the graphic design of a curved or warped surface with an image comprising lettering or pictures or both, wherein the graphic design is an image distorted in accordance with the curvature of the surface so that a view from a defined location appears undistorted.

BACKGROUND OF THE INVENTION

Distorted graphics have been described in the prior art, such as images from three-dimensional objects which are printed on a plane or an adhesive film which is subsequently attached to a plane, or painted on a substantially plane surface such as a lawn or a textile which is placed on the ground, in DE 198 37 887 A1. The origin of the picture in this case is mandatorily three-dimensional. The process described is governed by determination of angles, positioning of offset rods, or measuring staffs, and mathematical formulae.

In WO 98/43 231, a figurative print is printed on a plane carrier which print is comprised of at least a primary figurative element and optionally, a secondary figurative element which is a shadow or a relief or another three-dimensional effect element of the first figurative element. All prints are plane.

In EP 1 418 561 B1, corresponding to the utility model DE 203 17 063, a method of generating an advertisement print is disclosed where an advertisement print is printed on a plane carrier with a predefined surface area, the print being distorted so that printed letters appear to stand upright.

In EP 1 580 710 A2, an advertising board is described that bears an advertising image, such as a picture or lettering, which image comprises a first two-dimensional representation of the image, and a second two-dimensional representation of the same image, the two representations having an offset chosen such that there is a three-dimensional impression generated.

SUMMARY OF THE INVENTION

There has not been a method disclosed yet to provide a warped or curved surface with an image, where the image is distorted in a way to provide an undistorted view from a given point, for example when viewed by a camera.

It is therefore an object of the invention to provide a method of generating an image on a spatially warped or curved surface, particularly a surface that has an irregular spatial shape, which cannot be exactly described by a mathematical formula, such as a spherical or toroidical or ellipsoidal surface.

This object has been realised by providing a warped or curved surface with image elements that are distinguished from the background by their colour, viz., at least one of their lightness, saturation and hue. Each of these image elements which make up the image, which may be dots, or lines, or areas, the latter two being formed by adjacent dots, in a linear, or an areal manner, where adjacent dots preferably have the same colour, or at least a colour that is different from that of the surrounding region, generally referred to as "background", is characterised by its coordinates in three dimensions, and by its colour properties, lightness, saturation, and hue.

A further object is to provide a method of assigning the correct colour information to each of the dots characterised by its coordinates in three dimensions, and to apply this information to the dot by printing or spraying, or to simultaneously apply the colour information to more than one dot by applying the colour information to a plastic film which film may be drawable or shrinkable in a predetermined way, or which preferably is cut to size, and applied to the warped or curved surface in a predetermined way so that each of the dots on the warped or curved surface bears the correct colour information.

DETAILED DESCRIPTION OF THE PREFERRED EMBODIMENTS

Figure 1:
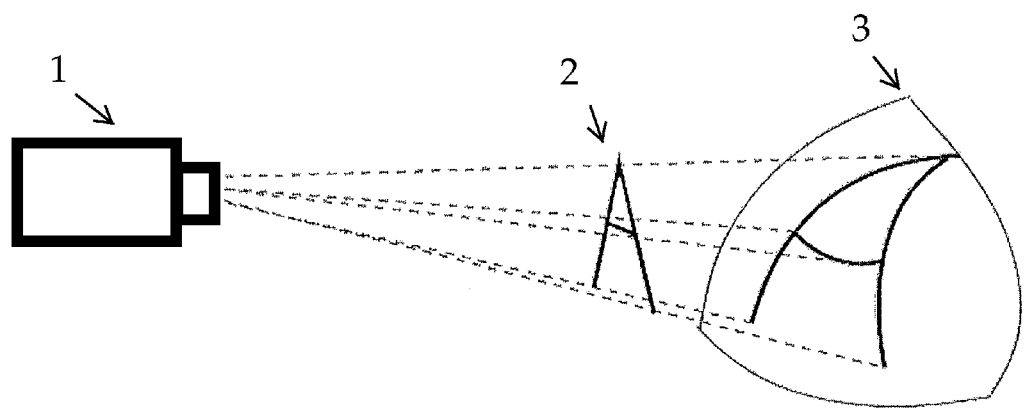
FIG. 1 illustrates a warped or curved surface is approximated by a plurality of spherical surface elements.

For each of the image elements, the following information has to be provided:

The three-dimensional coordinates of each point $P_i$ of the warped or curved surface where image elements shall be assigned, all of the image elements forming the image that is viewed from a chosen point or reference point, R.

For the sake of convenience, this chosen point or reference point R is assigned the relative coordinates (0; 0; 0) in a Cartesian system. Each point of the curved or warped surface can be defined by the relative coordinates in relation to this reference point, R=(0; 0; 0).

In accordance with the present invention, a warped or curved surface is provided with an image visible from a reference point R which is not an element of the image area of the said image on the said surface, characterised in that the reference point preferably has a fixed position with respect to the said surface, and the image on the said surface is distorted in a way to provide an undistorted view on the said image from the said reference point.

Preferably, the distortion of the image on the said surface is such that an undistorted image is generated on a focal plane by a focussing means which focussing means preferably has a fixed position with respect to the reference point.

Preferably, the focussing means is an optical lens. Depending on the distance between lens and the image of the warped or curved surface, it is also possible to use a Fresnel type lens. Mirrors may, of course, also be used.

In accordance with the present invention, a method is also provided to apply a distorted image on a warped or curved surface, which method comprises the steps of
- generating the coordinates of a plurality of points $P_i$ which are elements of the said warped or curved surface, the points $P_i$ being chosen such that they form a plurality of equilateral triangles or squares, or other, preferably regular, polygons that can be used to assemble the said warped or curved surface, and that the square distance between a point on the warped or curved surface whose vertical projection onto the nearest triangle or square or other polygon is in the centre of the said triangle or square or other polygon, and the centre point of the said triangle or square is not larger than the area of the said triangle or square multiplied by a resolution factor RF,
- calculating for each of these points $P_i$ the colour information comprising lightness, saturation, and hue from the undistorted image in the focal plane, and
- applying to each of the points $P_i$ on the said warped or curved surface a coloured dot having the colour information as calculated in the second step.

Preferably, this resolution factor RF is between 5 and 0.1, a lower resolution factor giving a better resolution, which is preferred in the case of the image comprising, or substantially consisting of lettering which must, of course, be readable. For a better resolution (lower resolution factor), the meshes of the three-dimensional grid formed by the points P become narrower. A resolution factor higher than 5 will lead to an image with low resolution, with pixels to be seen, not fit for legible lettering, while a lower resolution factor than 0.1 will render the grid approximation of the warped or curved surface very complicated, will lead to very high computing effort and very small mesh width.

The coloured dots can be applied with an ink jet printing head, or a paint spray gun, or similar means. A preferred method is to apply coloured dots by computer-aided painting or printing where spatial and colour coordinates are used to control the application of coloured paint or ink onto the surface. A particularly preferred method is attaching a printed film onto the warped or curved surface. Such films can easily be replaced, and do not need special treatment like thermal or irradiation crosslinking in the case of paints, or protection against mechanical abrasion or the effect of organic solvents like petrol, or gasoline, like in the case of ink jet printing.

Resilient films like polyester based or polypropylene based, or polyvinylchloride based films are particularly preferred. For printing on the films, a further transformation is, of course needed, which correlates each point $P_i$ on the warped or curved surface with a point on the film which film is flat when printed.

Preferably, the printed film is cut with a computer-controlled cutting tool so as to minimise overlap before application thereof to the said warped or curved surface. In this case, the computer-controlled cutting tool is preferably programmed using the coordinate information of the first step of the process as described supra.

Coordinate information for the individual points $P_i$ making up the warped or curved surface can be provided by simple calculation if the shape of the warped or curved surface is available from CAD data (Computer-Aided Design). The shape of the surface can then be viewed in the form of a three-dimensional grid, where each of the grid points $P_{gi}$ is characterised by its coordinates ($x_{gi}$; $y_{gi}$; $z_{gi}$) relative to the reference point R.

In most real cases, however, the CAD data which may have been a guidance for shaping the warped or curved surface do not fully coincide with the real dimensions of the said surface. This is the case, particularly, if a car body of a racing car is made from fibre-reinforced thermoset or thermoplastic material which may shrink unevenly upon curing or solidification, and therefore deviate in its shape from the target shape, or desired values. It may, of course also be the case that there are no CAD guiding data available at all.

In such cases, the shape of the surface where the image elements shall be applied may be measured by mechanical means (such as with a stylus instrument), by optical means (such as laser holography, interferometry), or by combination of any of these methods, as provided by the state of the art, and described, by construction of a grid similar to that provided by CAD data. Depending on the desired resolution, the mesh size of the grid will be chosen accordingly.

In the next step, a projection has to be made for each dot $P_j(x_j; y_j; z_j)$ which makes up the image in the focal or imaging plane of the camera via the focussing element (lens or mirror) of the camera onto the warped or curved surface to its corresponding dot $P_i(x_i; y_i; z_i)$. This projection is performed with the usual means of analytical geometry, by simple transformation. The difference with regard to the known methods from the prior art is that not all dots $P_i$ lie in the same plane, but have different distances to the reference point, distances not being constant, nor being steadily increasing or decreasing as is the case with a plane projection surface.

The warped or curved surface can preferably be approximated by a plurality of plane triangles or plane squares as area elements, the length of the edges thereof being chosen according to the desired resolution. It is also possible with smaller errors, to approximate the warped or curved surface by a plurality of concave or convex spherical or ellipsoidal surface elements which are chosen such that there is no discontinuity or at least no discontinuity larger than a preset value, in curvature at the borders of the concave or convex spherical or ellipsoidal surface elements.

For easier understanding, the following explanation starts from the image that is constructed in a camera consisting of the dots or points $P_j$ which corresponds to the image viewed from the reference point, such as an on-board camera in a racing car. These dots or points $P_j$ have now to be projected onto the warped or curved surface. Each of these points or dots is fully characterised by the set of spatial coordinates with respect to a fixed point, and by its colour coordinates.

If the warped or curved surface is approximated by a plurality of spherical surface elements, as shown in FIG. 1 for one spherical element only, for the sake of clarity, a fictitious letter "A", denoted as 2, viewed upright and undistorted, in a plane parallel to the focal plane of a camera, by camera 1, the image of it being, as known by the person skilled in the art, laterally reversed and upside down, in the focal plane of the camera, is shown distorted in the spherical element 3 of the warped or curved surface.

Figure 2:
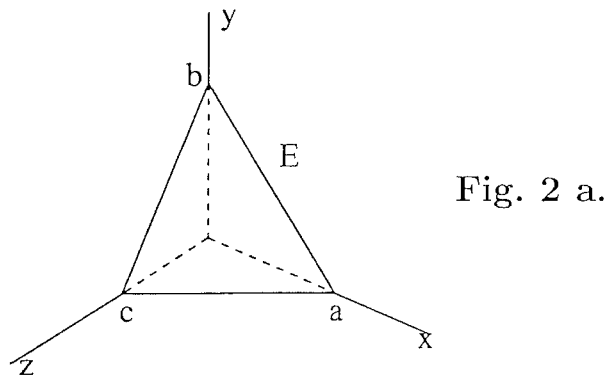
FIG. 2a illustrates a flat triangular surface element E of the warped or curved surface.
FIG. 2b illustrates a projection of the image 2' onto an area element which is a plane square on the warped or curved surface.
FIG. 2c illustrates a sample lettering consisting of the three letters "A", "K", and "Z", as viewed undistorted in the camera as 2", is distorted as 3".
Figure 2:
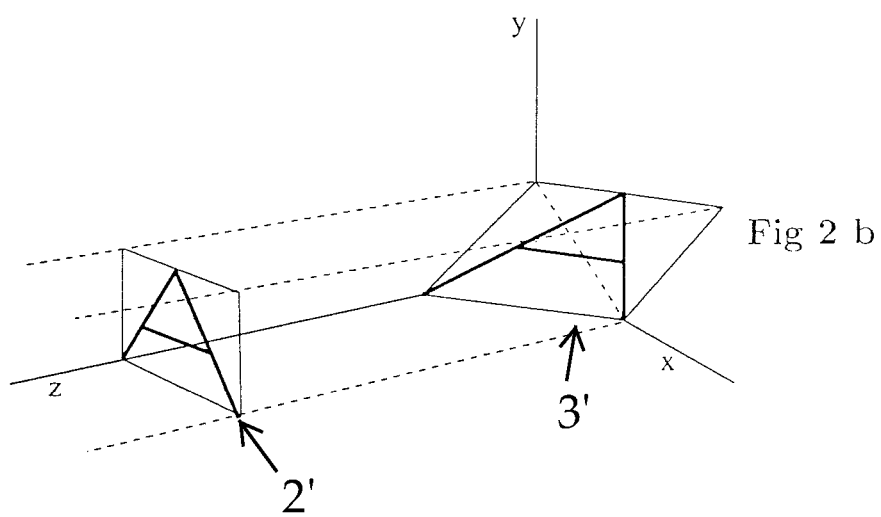
Figure 2:
Figure 2:

In the case of approximation of the curved surface by a plurality of triangles, this projection is as depicted in FIG. 2. FIG. 2a shows a flat triangular surface element E of the warped or curved surface. FIG. 2b shows a projection of the image 2' onto an area element which is a plane square on the warped or curved surface, the square constituting an individual plane element in the grid of the said warped or curved surface. It is seen in what way the letter "A" is distorted by the projection onto the said square surface element on the warped or curved surface. In a similar way, a sample lettering consisting of the three letters "A", "K", and "Z", as viewed undistorted in the camera as 2", is distorted as 3", as shown in FIG. 2c.

In the cases of these approximations, or decompositions, of the warped or curved surface into a plurality of surface elements, having square, or triangular, or spherical shape, calculation of the needed distortion is possible with the means of analytical geometry.

Referring now to FIGS. 2a and 2b, the following abbreviations are used for a triangular surface element as shown in FIG. 2a, with an auxiliary orthogonal coordinate system with the axes symmetrically touching the corners of a equilateral triangle, the corners of which being referred to as a, b, and c, the side lengths s=$\overline{ab}$=$\overline{bc}$=$\overline{ca}$ (the length s of a side of the equilateral triangle between points a and b, points b and c, and points c and a where a, b, and c are the corner points defining the equilateral triangle), and the origin of the auxiliary coordinate system being a point in space with equal distance to the three corner points of the said triangle, viz., a, b, c, where $$a = \left(\frac{1}{2}\sqrt{2} \cdot s; 0; 0\right), b = \left(0; \frac{1}{2}\sqrt{2} \cdot s; 0\right), \text{ and } c = \left(0; 0; \frac{1}{2}\sqrt{2} \cdot s\right);$$

$$\lambda = 1(1/a^2 + 1/b^2 + 1/c^2)^{\frac{1}{2}}$$

and $$\alpha = \lambda/a; \beta = \lambda/b; \text{ and } \gamma = \lambda/c.$$

Any dot $P_j$ ($x_j$; $y_j$; $z_j$) of a figure F in FIG. 2b (in this case the letter "A", item 2') in the focal plane of a camera corresponds to a dot $P_i$($x_i$; $y_i$; $z_i$) on a plane square area element E of a warped or curved surface, where the coordinates of the said dot $P_i$ with relation to the auxiliary coordinate system as described supra are $x_i$=(1+$\alpha^2$/[$\gamma$(1+$\gamma$)])·$x_j$+$\alpha$·$\beta$/[$\gamma$(1+$\gamma$)])·$y_j$, $y_i$=$\alpha$·$\beta$/[$\gamma$(1+$\gamma$)])·$x_j$+(1+$\alpha^2$/[$\gamma$(1+$\gamma$)])·$y_j$, and $z_i$=$z_j$+d, for all dots of the figure F' on the area element E, also referred to as 3', of the warped or curved surface. The plane square intersects the planes of the coordinate system as shown in FIG. 2a, thereby forming the equilateral triangle which is shown in FIG. 2a.

In a first approximation, the distance d for each of the individual surface elements can be regarded as constant within the said surface element, as the distance from the focal plane to the object F' is large in comparison to the distances in x- and y-directions between the individual dots in the focal plane. For short distances between focal plane and image, an exact calculation has to be used.

This figure F' on the area element E of the warped or curved surface can now be seen undistorted, as its image F in the said focal plane of the said camera.

Figure 3:
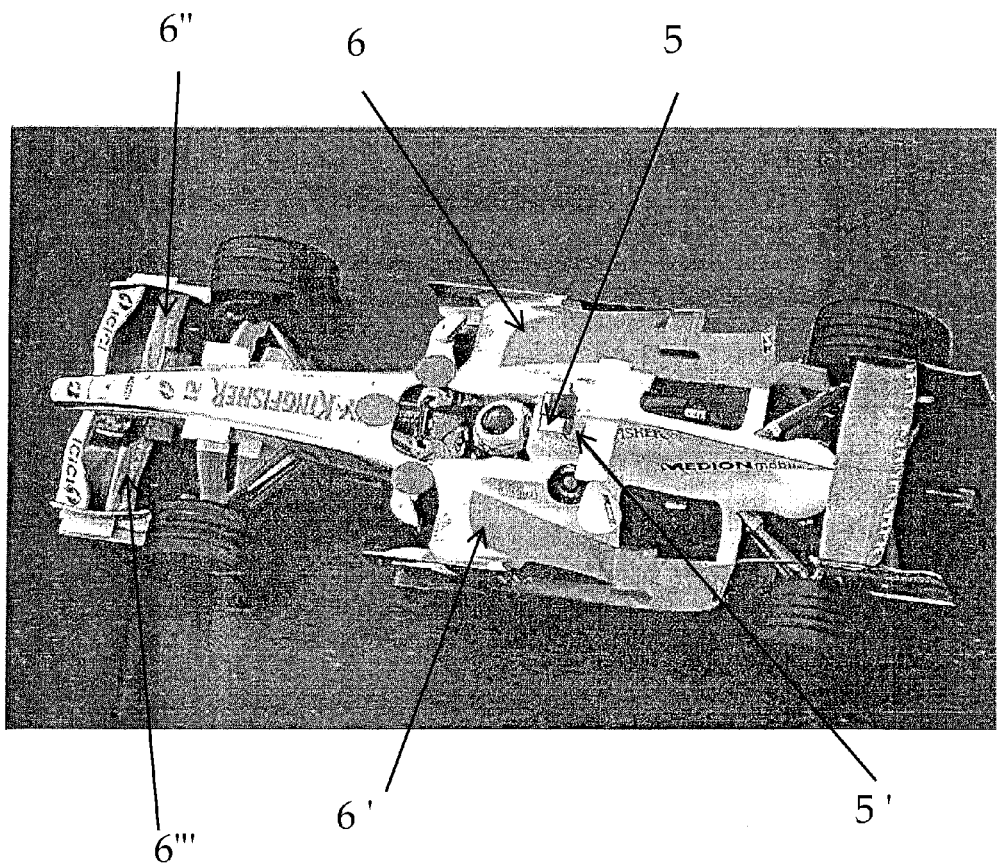
FIG. 3 shows a view of a racing car, with lettering on plane surfaces.

FIG. 3 shows a view of a racing car, with lettering on plane surfaces. There remain many surfaces marked as 6, 6', 6", 6''' that are warped or curved, which have not yet been used for advertisement purposes due to the restricted visibility. It is possible, with the distorted images according to the present application, to use these hitherto unused regions for advertisement purposes.

Figure 4:
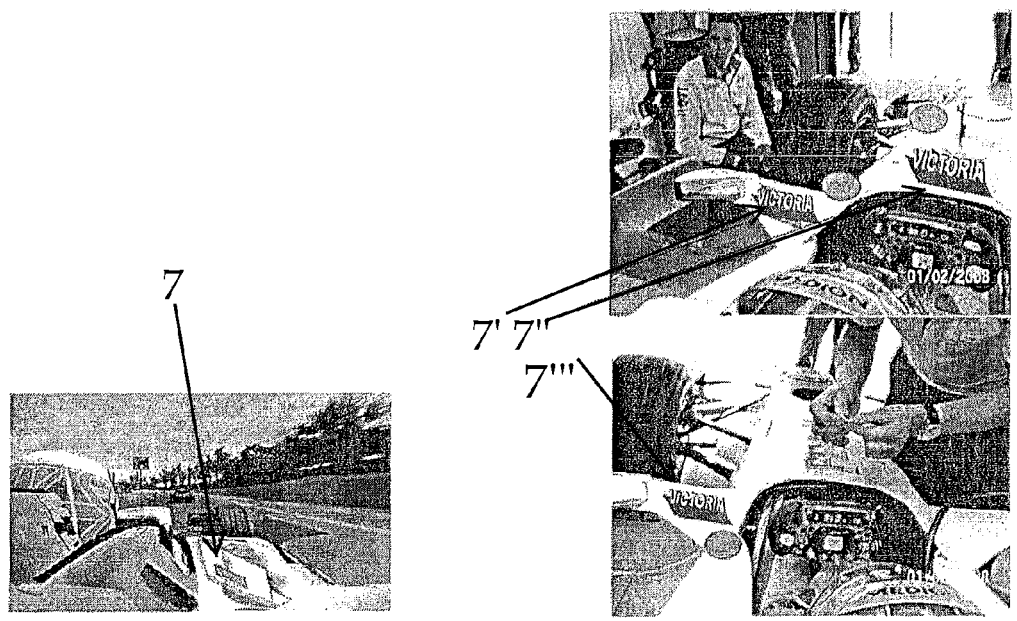
FIG. 4 shows another view onto surfaces of a racing car marked as 7, 7', 7", and 7'" that are warped or curved, and which have not yet been used for advertisement purposes due to restricted visibility.

FIG. 4 shows another view onto surfaces of a racing car marked as 7, 7', 7", and 7''' that are warped or curved, and which have not yet been used for advertisement purposes due to restricted visibility. It is also possible, with the distorted images according to the present application, to use these hitherto unused regions for advertisement purposes.

LIST OF REFERENCE NUMERALS 1 on-board camera
2, 2', 2" undistorted text
3, 3', 3" distorted text
x, y, z axes in a Cartesian system of coordinates
E plane
a, b, c axis intersections of a triangular surface element (x-, y- and z-axes)
5, 5' positions for on-board cameras
6, 6', 6", 6''' positions for advertisement images according to the invention
7, 7', 7", 7''' positions for advertisement images according to the invention

The invention claimed is:

1. A method of applying a distorted image on a warped or curved surface which surface has an irregular spatial shape, wherein the distortion is made in a way that an undistorted view on the said image is provided from a reference point which is not an element of the said surface, the reference point having a fixed position with respect to the said surface, and wherein the distortion of the image on the said surface is such that an undistorted image made up by points $P_j$ ($x_j$; $y_j$; $z_j$) with the coordinates $x_j$, $y_j$, and $z_j$ is generated on a focal plane by a focussing means which focussing means has a fixed position with respect to the reference point, comprising the steps of generating the coordinates of a plurality of points $P_i$ which are elements of the said warped or curved surface, the points $P_i$ being chosen such that they form a plurality of equilateral triangles, and that the square distance between a point on the warped or curved surface whose vertical projection onto the nearest triangle is in the center of the said triangle, and the center point of the said triangle is not larger than the area of the said triangle multiplied by a resolution factor RF, wherein the resolution factor RF is between 0.1 and 5, and wherein the coordinates $x_i$, $y_i$, and $z_i$ for any point $P_i$ ($x_i$; $y_i$; $z_i$) on the warped or curved surface are calculated from the coordinates $x_j$, $y_j$, and $z_j$ of the points $P_j$ as $x_i$=(1+$\alpha^2$/[$\gamma$(1+$\gamma$)])·$x_j$+$\alpha$·$\beta$/[$\gamma$(1+$\gamma$)])·$y_j$, $y_i$=$\alpha$·$\beta$/[$\gamma$(1+$\gamma$)])·$x_j$+(1+$\alpha^2$/[$\gamma$(1+$\gamma$)])·$y_j$, and $z_i$=$z_j$+d, where $\alpha$=$\lambda$/a; $\beta$=$\lambda$/b; and $\gamma$=$\lambda$/c, and
a, b, and c are the coordinates of the corner points of the equilateral triangle
a=($_{1/2\sqrt{2}}$·s; 0; 0), b=(0; $_{1/2\sqrt{2}}$·s; 0), and c=(0; 0; $_{1/2\sqrt{2}}$·s), where s is the length of any side of the equilateral triangle, and $\lambda$=1/(1/$a^2$+1/$b^2$+1/$c^2$)$^{1/2}$ and d is the distance between the focal plane and the individual points $P_i$ which make up the surface elements on the warped or curved surface, calculating for each of these points $P_i$ the colour information comprising lightness, saturation, and hue from the undistorted image in the focal plane, and applying to each of the points $P_i$ on the said warped or curved surface a coloured dot having the colour information as calculated in the second step.

2. A warped or curved surface provided with a distorted image applied by the method of claim 1.

3. The warped or curved surface with a distorted image of claim 2, wherein the distortion of the image on the said surface is such that an undistorted image is generated on a focal plane by a focussing means which focussing means has a fixed position with respect to the reference point.

4. The warped or curved surface with a distorted image of claim 3, wherein the focussing means is an optical lens or a mirror.

5. The method of claim 1 where a coloured dot is applied with an ink jet printing head.

6. The method of claim 1 where a coloured dot is applied with a paint spray gun.

7. The method of claim 1 where a coloured dot is applied by attaching a printed film onto the warped or curved surface.

8. The method of claim 7 wherein the printed film is cut with a computer cutting tool so as to minimise overlap before application thereof to the said warped or curved surface.

9. The method of claim 7 wherein the printed film is cut with a computer cutting tool so as to minimise overlap before application thereof to the said warped or curved surface, and wherein the computer cutting tool is programmed using the coordinate information of a plurality of points Pi which are elements of the said warped or curved surface, the points Pi being chosen such that they foam a plurality of equilateral triangles or squares, and that the square distance between a point on the warped or curved surface whose vertical projection onto the nearest triangle or square is in the center of the said triangle or square, and the center point of the said triangle or square is not larger than the area of the said triangle or square multiplied by a resolution factor RF which is between 0.1 and 5.

\* \* \* \* \*